US008653196B2

(12) United States Patent
Mazzola et al.

(10) Patent No.: US 8,653,196 B2
(45) Date of Patent: Feb. 18, 2014

(54) METHOD FOR PREPARING POLYETHYLENE WITH HIGH MELT STRENGTH

(75) Inventors: Nicolas C. Mazzola, Jundiai (BR); Mariana D. Mancini, Sao Paulo (BR); Jorge C. Gomes, Sao Paulo (BR)

(73) Assignee: Dow Global Technologies, LLC, Midland, MI (US)

( * ) Notice: Subject to any disclaimer, the term of this patent is extended or adjusted under 35 U.S.C. 154(b) by 452 days.

(21) Appl. No.: 12/685,148

(22) Filed: Jan. 11, 2010

(65) Prior Publication Data

US 2011/0171407 A1 Jul. 14, 2011

(51) Int. Cl.
C08F 8/00 (2006.01)
C08F 8/30 (2006.01)
C08F 10/02 (2006.01)
C08K 5/32 (2006.01)
C08L 23/36 (2006.01)
C08J 3/22 (2006.01)

(52) U.S. Cl.
USPC ........ 525/194; 525/240; 525/333.7; 525/374; 525/377; 525/380

(58) Field of Classification Search
USPC ............... 525/194, 240, 333.7, 374, 377, 380
See application file for complete search history.

(56) References Cited

U.S. PATENT DOCUMENTS

| 4,390,666 | A | 6/1983 | Moriguchi et al. |
| 4,409,367 | A | 10/1983 | Beijleveld et al. |
| 4,603,173 | A | 7/1986 | Mack et al. |
| 5,486,575 | A | 1/1996 | Shroff |
| 5,685,128 | A * | 11/1997 | Chum et al. .................... 53/441 |
| 6,521,338 | B1 * | 2/2003 | Maka ..................... 428/355 EN |
| 6,706,822 | B2 | 3/2004 | Guenther et al. |
| 6,984,698 | B2 | 1/2006 | McLeod et al. |
| 7,579,411 | B2 | 8/2009 | Roth et al. |
| 2003/0216494 | A1 * | 11/2003 | Roth et al. ....................... 524/95 |
| 2003/0236328 | A1 | 12/2003 | McLeod et al. |
| 2005/0197433 | A1 | 9/2005 | Roth et al. |
| 2008/0199673 | A1 | 8/2008 | Allgeuer et al. |
| 2009/0209158 | A1 | 8/2009 | Richeson et al. |
| 2010/0210800 | A1 | 8/2010 | Roth et al. |
| 2011/0003940 | A1 | 1/2011 | Karjala et al. |
| 2011/0171407 | A1 | 7/2011 | Mazzola |
| 2012/0283390 | A1 | 11/2012 | Demirors et al. |
| 2013/0035444 | A1 | 2/2013 | Karjala et al. |

FOREIGN PATENT DOCUMENTS

| EP | 0056674 A1 | 7/1982 |
| EP | 1229053 A2 | 8/2002 |
| WO | WO-0190113 A1 | 11/2001 |
| WO | WO-2005090419 A1 | 9/2005 |
| WO | WO-2007024447 A1 | 3/2007 |
| WO | WO-2007145713 A1 | 12/2007 |

OTHER PUBLICATIONS

Scaffaro et al., Polymer Degradation and Stability 91 (2006) 3110-3116.*
Purell GB7250 HDPE; https://polymers.lyondellbasell.com/portal/binary/com.vignette.vps.basell.productgrade.
ProductGradeFileDisplay?id=e4e5a91b51980110VgnVCM100000646f3c14RCRD&type=iso; Apr. 2012.*
Lupolen 1812 E LDPE; http://www.matweb.com/search/datasheet.aspx?matguid=9ae232a113dc459a88faf7606b7c4ade; Apr. 2012.*
IPRP for PCT/US2011/020839, Mail Date Apr. 30, 2013, 8 pages.
IPRP for PCT/US2011/020846, Mail Date May 27, 2013, 20 pages.
IPRP for PCT/US2011/020850, Mail Date Jul. 17, 2012, 8 pages.
IPRP for PCT/US2011/020853, Mail Date Jul. 17, 2012, 8 pages.
La Mantia et al., "Processability and Properties of Re-Graded, Photo-Oxidized Post-Consumer Greenhouse Films", Macromolecular Materials and Engineering, vol. 290, Issue 10, pp. 970-975, Oct. 20, 2005.
La Mantia et al., "Re-Gradation of Photo-Oxidized Post-Consumer Greenhouse Films", Macromolecular Rapid Communications, vol. 26, Issue 5, pp. 361-364, Mar. 4, 2005.
Reach En CLP Stoffenchecker, "Octadecanoic acid, [9-(acetyloxy)-3,8,10-triethyl-7,8,10-trimethyl-1,5-dioxa-9-azaspiro[5.5]undec-3-yl]methyl ester", Internet Citation, Dec. 16, 2009 XP-002633360.
R. Scaffaro et al., "Effect of the additive level and of the processing temperature on the re-building of post-consumer pipes from polyethylene blends", European Polymer Journal, vol. 43, Issue 7, Jul. 2007, pp. 2947-2955.
R. Scaffaro, et al., "On the effectiveness of different additives and concentrations on the re-building of the molecular structure of degraded polyethylene", Polymer Degradation and Stability, vol. 91, Issue 12, Dec. 2006, pp. 3110-3116.
International Search Report for PCT/US2011/020850, Mail Date Mar. 5, 2011, 3 pages.
International Search Report for PCT/US2011/020839, Mail Date Mar. 5, 2011, 5 pages.

(Continued)

Primary Examiner — Roberto Rabago

(57) ABSTRACT

The present invention is a method for increasing the melt strength of a polyethylene resin comprising reacting the polyethylene resin with an alkoxy amine derivative corresponding to the formula:

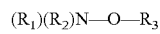

$(R_1)(R_2)N-O-R_3$ where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and where $R_3$ is hydrogen, a hyrdrocarbon or a substituted hydrocarbon group comprising O and/or N. Preferred groups for $R_3$ include —$C_1$-$C_{19}$alkyl; —$C_6$-$C_{10}$aryl; —$C_2$-$C_{19}$akenyl; —O—$C_1$-$C_{19}$alkyl; —O—$C_6$-$C_{10}$aryl; —NH—$C_1$-$C_{19}$alkyl; —NH—$C_6$-$C_{10}$aryl; —N—($C_1$-$C_{19}$alkyl)$_2$. $R_3$ most preferably contains an acyl group.

9 Claims, 1 Drawing Sheet

(56) References Cited

OTHER PUBLICATIONS

International Search Report for PCT/US2011/020846, Mail Date Mar. 5, 2011, 4 pages.
International Search Report for PCT/US2011/020853, Mail Date Mar. 5, 2011, 4 pages.
Written Opinion for PCT/US2011/020846, Mail Date Mar. 5, 2011, 7 pages.
Written Opinion for PCT/US2011/020850, Mail Date Mar. 5, 2011, 7 pages.
Written Opinion for PCT/US2011/020853, Mail Date Mar. 5, 2011, 7 pages.
Written Opinion for PCT/US2011/020839, Mail Date Mar. 5, 2011, 7 pages.

* cited by examiner

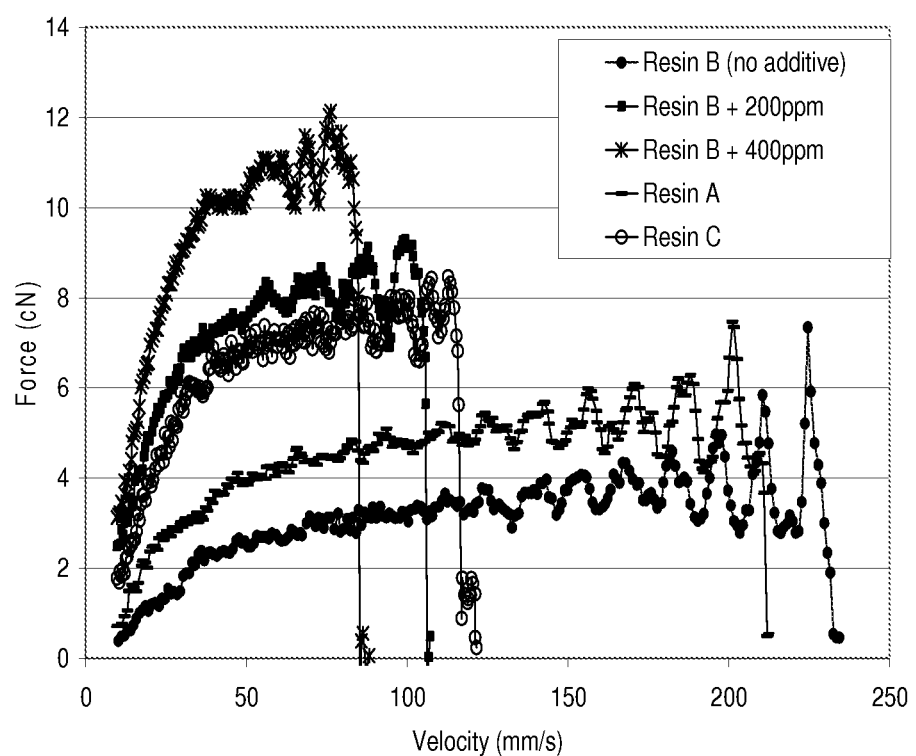

METHOD FOR PREPARING POLYETHYLENE WITH HIGH MELT STRENGTH

BACKGROUND AND SUMMARY OF THE INVENTION

Polyethylene has desirable properties that have helped to make it the highest volume polymer manufactured. Polyethylene can be made in different processes in order to give different properties. Known families of polyethylene include high density polyethylene (HDPE), linear low density polyethylene (LLDPE), and low density polyethylene made using high pressure reactors (LDPE). Within these broad classes many variations exist resulting from different types of reactors (for example, solution, slurry or gas phase) or from the use of different catalysts (for example, Ziegler-Natta or constrained geometry catalysts). The desired application requires a careful balance of rheological properties which will lead a person of skill in the art to select one type of polyethylene over another. In many applications, such as blow-molding and blown film applications, melt strength of the polyethylene is a key parameter, frequently measured as elongational viscosity of the polymer.

The melt strength is a practical measurement that can predict material performance when submitted at elongational deformations. In melt processing good elongational viscosity is important to maintain stability during processes such as coating, blow film production, fiber spinning and foamed parts. The melt strength is related with a number of molecular entanglements on molten polymers and relaxation times of each molecular structure, which is basically dependant on overall molecular weight and number of branches over critical molecular weight.

Melt strength directly effects several processing parameters such as bubble stability and therefore thickness variation during blow film production; parison formation during blow molding process; sagging during profile extrusion; cells formation during foaming process; more stable thickness distribution during sheet/film thermoforming.

This property can be enhanced by using resins with higher molecular weight, but such resins will generally require more robust equipment and more energy use because they tend to generate higher extrusion pressure during the extrusion process. Therefore, properties must be balanced to provide an acceptable combination of physical properties and processability.

The use of highly branched polymers such as LDPE to increase melt strength or specific catalyst system that incorporates a high level of long-chain branching into the polyethylene are other alternatives to enhance material processability during extrusion. However, while some properties are improved, high levels of long-chain branching can hurt other properties. It would be desirable to be able to prepare polyethylene with excellent blow-molding properties with Ziegler-Natta catalyst systems while avoiding tradeoffs of other catalysts and high pressure process. For example, the poorer physical properties caused by long-chain branching and cost limitations of single-site catalysts are preferably avoided.

Currently, when increase melt strength is desired, the most common approach is to include peroxides to crosslink the polyethylene. For example, U.S. Pat. No. 5,486,575 improves the properties of a polyethylene resin prepared from a chromium catalyst by using an organic peroxide. U.S. Pat. Nos. 4,390,666 and 4,603,173 use peroxides to crosslink a polyethylene blend containing high and low molecular weight components. U.S. Pat. No. 6,706,822 uses peroxides with polyethylene having a broad molecular weight distribution to reduce melt swell. U.S. Pat. No. 5,486,575 uses peroxides with polyethylene prepared with chromium catalysts. While some properties can be improved by crosslinking with peroxides, there are issues with this approach. The radicals produced can interact deleteriously with other additives. It is difficult to predict the effect of crosslinking on rheological properties. Reported results vary significantly from resin to resin, even when the resins are produced using similar catalyst technologies. Peroxides add an extra component to the composition, and they require careful handling and storage, which adds to the cost. It would be desirable to improve properties without using peroxides.

The present invention is a new process for increasing the melt strength of polyethylene involving reacting molten polyethylene with an alkoxyamine derivative through regular extrusion processing. Accordingly, one aspect of the invention is a method for increasing the melt strength of a polyethylene resin comprising first selecting a polyethylene resin having a density, as determined according to ASTM D792, in the range of from 0.865 g/cm$^3$ to 0.962 g/cm$^3$, and a melt index, as determined according to ASTM D1238 (2.16 kg, 190° C.), in the range of from 0.01 g/10 min to 100 g/10 min and then reacting an alkoxy amine derivative with the polyethylene resin in an amount and under conditions sufficient to increase the melt strength of the polyethylene resin.

The present invention is a new process for increasing the elongational viscosity of polyethylene involving reacting molten polyethylene with an alkoxyamine derivative through regular extrusion processing. Accordingly, one aspect of the invention is a method for increasing the melt strength of a polyethylene resin comprising first selecting a polyethylene resin having a density, as determined according to ASTM D792, in the range of from 0.865 g/cm$^3$ to 0.962 g/cm$^3$, and a melt index, as determined according to ASTM D1238 (2.16 kg, 190° C.), in the range of from 0.01 g/10 min to 100 g/10 min and then reacting an alkoxy amine derivative with the polyethylene resin in an amount and under conditions sufficient to increase the elongational viscosity of the polyethylene resin.

BRIEF DESCRIPTION OF THE DRAWINGS

FIG. 1 is a plot of melt strength versus stretching velocity with increasing additive concentration.

DETAILED DESCRIPTION OF THE INVENTION

In its broadest sense, the present invention is a method for increasing the melt strength of a polyethylene resin. Polyethylene resin includes all polymers or polymer blends which are derived at least 50% by weight from ethylene monomer units. This includes materials known in the art as high density polyethylene (HDPE), linear low density polyethylene (LLDPE), and low density polyethylene made using high pressure reactors (LDPE).

The polyethylene resin selected should have a density, as determined according to ASTM D792, in the range of from 0.865 g/cm$^3$ to 0.962 g/cm$^3$, more preferably from 0.905 g/cm$^3$ to 0.957 g/cm$^3$ and a melt index, as determined according to ASTM D1238 (2.16 kg, 190° C.), in the range of from 0.01 g/10 min to 100 g/10 min, more preferably 0.1 g/10 min to 15 g/10 min. Polyethylene with a melt index ($I_2$) of 2.5 g/10 min or less may particularly benefit from this invention. Suitable polyethylene resins can be produced with conventional Ziegler Natta or Chromium catalysts but also with metallocene or single site catalysts. Such resins may have monomodal or multimodal molecular weight distributions.

Once the polyethylene resin is selected, it is reacted with an alkoxy amine derivative. For purposes of the present invention "alkoxy amine derivatives" includes nitroxide derivatives. The alkoxy amine derivative is added in an amount and under conditions sufficient to increase the melt strength of the polyethylene resin. The alkoxy amine derivatives correspond to the formula:

$$(R_1)(R_2)N-O-R_3$$

where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and where $R_3$ is hydrogen, a hyrdrocarbon or a substituted hydrocarbon group comprising O and/or N. Preferred groups for $R_3$ include —$C_1$-$C_{19}$alkyl; —$C_6$-$C_{10}$aryl; —$C_2$-$C_{19}$akenyl; —O—$C_1$-$C_{19}$alkenyl; —O—$C_1$-$C_{19}$aryl; —NH—$C_1$-$C_{19}$alkyl; —NH—$C_6$-$C_{10}$aryl; —N—($C_1$-$C_{19}$alkyl)$_2$. $R_3$ most preferably contains an acyl group.

The preferred compound may form nitroxylradical (R1)(R2)N—O* or amynilradical (R1)(R2)N* after decomposition or thermolysis.

A particularly preferred species of alkoxy amine derivative is 9-(acetyloxy)-3,8,10-triethyl-7,8,10-trimethyl-1,5-dioxa-9-azaspiro[5.5]undec-3-yl]methyl octadecanoate which has the following chemical structure:

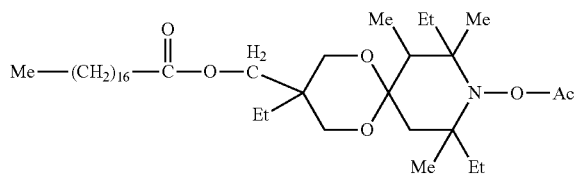

Examples of some preferred species for use in the present invention include the following:

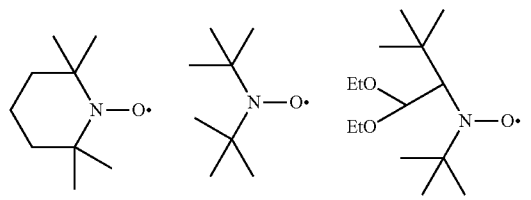

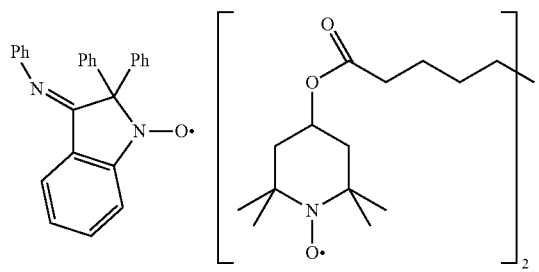

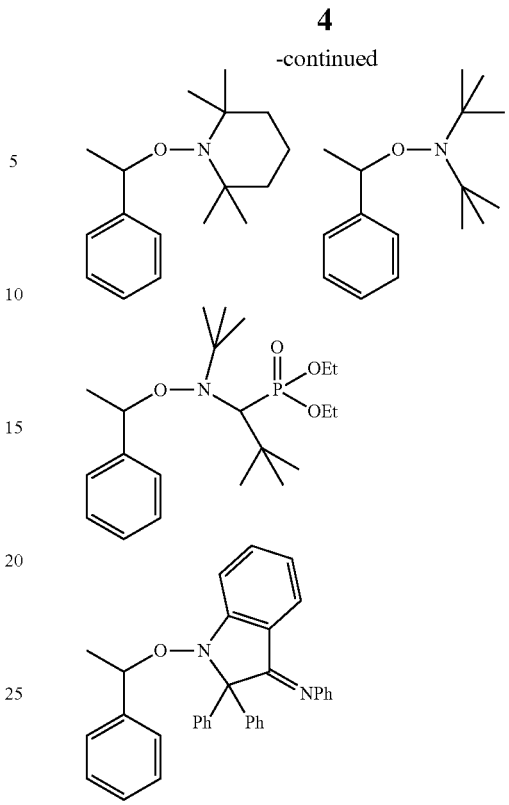

In general hydroxyl amine esters are more preferred with one particularly favored hydroxyl amine ester being 9-(acetyloxy)-3,8,10-triethyl-7,8,10-trimethyl-1,5-dioxa-9-azaspiro [5.5]undec-3-yl]methyl octadecanoate.

The alkoxy amine derivatives are added in an amount sufficient to increase the melt strength and/or increase the elongational viscosity to the desired level. In general the alkoxy amine derivatives are added in an amount of from 1 to 1000 ppm of the polyethylene polymer by weight, more preferably from 40 to 800 ppm. In another embodiment, the alkoxy amine derivative is added in an amount of from 0.01% to 5% of the polyethylene polymer by weight.

The addition to the polyethylene polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing. Particularly preferred processing machines are single-screw extruders, contra rotating and co rotating twin-screw extruders, planetary-gear extruders, ring extruders or cokneaders. It is also possible to use processing machines provided with at least one gas removal compartment to which a vacuum can be applied. Suitable extruders and kneaders are described, for example, in Handbuch der Kunststoftextrusion, VoL 1 Grundlagen, Editors F. Hensen, W. Knappe, H. Potente, 1989, pp. 3-7, ISBN.3-446-14339-4 (VoL 2 Extrusionsanlagen 1986, ISBN 3-446-14329-7). For example, the screw length can be 1-60 times the screw diameter, preferably 35-48 times the screw diameters. The rotational speed of the screw is preferably 10-600 rotations per minute (rpm), more preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The polymers need to be subjected to an elevated temperature for a sufficient period of time, so that the desired degradation occurs. The temperature is generally above the softening point of the polymers. In a preferred embodiment of the process of the present invention, a temperature range lower than 280° C., particularly from about 160° C. to 280° C. is employed. In a particularly preferred process variant, the temperature range from about 200° C. to 270° C. is employed.

The period of time necessary for degradation can vary as a function of the temperature, the amount of material to be degraded and the type of, for example, extruder used. It is usually from about 10 seconds to 20 minutes, in particular from 20 seconds to 10 minutes.

The alkoxy amine derivative can advantageously be added to the mixing device by use of a masterbatch. As will be appreciated by those of ordinary skill in the art, the carrier resin for the masterbatch should be chosen to be compatible with the resin to be modified. LDPE High pressure low density polyethylene polymers (referred to in the industry as "LDPE") were unexpectedly found to be the preferred carrier due to the lower reactivity as evidenced by little variation of the extrusion pressure during masterbatch production.

Melt strength was determined using a Göttfert Rheotens apparatus. The air gap—distance from the die exit to the take-up wheels—is set to 100 mm, and the wheels acceleration is 2.4 mm/s². The melt is produced by a Göttfert Rheotester 2000 at 190° C. unless otherwise specified, equipped with a 12 mm barrel and a die with flat entrance (L=30 mm and ID=2 mm) at a piston speed of 0.265 mm/s. The Rheotens Melt strength values, which are reported in centi-Newtons (cN), correspond to the force experienced by the wheels at the maximum velocity, that is, right before rupture of the sample.

Resin modified according to the methods of the present invention will exhibit an increase in melt strength of at least 25%, preferably in the range of from 30 to 50% as compared to the same or substantially similar resin which has not been reacted with the alkoxy amine derivative. Similar performance improvement will also be seen with respect to elongational viscosity With the increase in melt strength and/or elongational viscosity, resins made according to the present invention are particularly well suited for fabricated articles such as films, sheets, pipes or blow molded articles.

EXAMPLES

The four examples described below have a similar molecular weight, with different concentrations of an alkoxy amine derivative additive. The specific additive used is 9-(acetyloxy)-3,8,10-triethyl-7,8,10-trimethyl-1,5-dioxa-9-azaspiro[5.5]undec-3-yl]methyl octadecanoate, which was added as an LDPE masterbatch having less than 4% of the additive (note that the ppm levels reported below refer to the active ingredient only and not the entire masterbatch). The melt strength of each of these examples is measured using Göttfert Rheotester 2000 at 190° C.

FIG. 1 shows the melt strength curve versus stretching velocity with increasing additive concentration. The incorporation of the additive changes the behavior of Resin B, increasing the force need to stretch the molten polymer.

Resin Description:

Resin A is a Ziegler-Natta catalyzed polyethylene resin made in a solution process having melt index of 0.5 g/10 min (at 190° C., 2.16 kg ASTM D-1238) and a density 0.921 g/cm³ (ASTM D792)

Resin B is a Ziegler-Natta catalyzed polyethylene resin made in a solution process having a melt index of 1.0 g/10 min (at 190° C., 2.16 kg ASTM D-1238_and a density 0.920 g/cm³ (ASTM D792)

Resin C is a Ziegler-Natta catalyzed polyethylene made in a slurry process having a melt index of 0.27 g/10 min (at 190° C., 2.16 kg ASTM D-1238) and a density of 0.956 g/cm³ (ASTM D792).

| Samples | Density g/cm³ (ASTM D792) | Conventional GPC | | | | Melt Strength (cN) |
| --- | --- | --- | --- | --- | --- | --- |
| | | Mn | Mw | Mz | Mw/Mn | |
| Resin A | 0.921 | 27,530 | 125,820 | 378,600 | 4.57 | 5.8 |
| Resin B (no additive) | 0.920 | 25,860 | 114,470 | 369,300 | 4.43 | 3.9 |
| Resin B + 200 ppm additive | 0.920 | 26,830 | 115,690 | 353,900 | 4.31 | 8.1 |
| Resin B + 400 ppm additive | 0.920 | 25,470 | 117,120 | 359,600 | 4.6 | 11.2 |
| Resin C | 0.956 | 11.730 | 183.070 | 1052.000 | 15.61 | 7.7 |

From the above examples, it is demonstrated that addition of the additive results in changes to the molecular weight distribution and significantly increases melt strength, at levels compared to blow molding resins produced via slurry polymerization (Resin C), without significant increasing molecular weight. It can also be seen that the addition of the additive results in resins having higher melt strength than resins with higher molecular weight that were made using same polymerization technology (Resin A).

What is claimed is:

1. A method for increasing the melt strength of a polyethylene resin comprising the steps of:
   a. selecting a polyethylene resin having a density, as determined according to ASTM D792, in the range of from 0.865 g/cm³ to 0.962 g/cm³, and a melt index, as determined according to ASTM D1238 (2.16 kg, 190° C.), in the range of from 0.01 g/10min to 100 g/10 min, wherein the polyethylene resin is selected from the group consisting of high density polyethylene (HDPE), linear low density polyethylene (LLDPE) and blends thereof;
   b. reacting an alkoxy amine derivative with the polyethylene resin in an amount and under conditions sufficient to increase the melt strength of the polyethylene resin, wherein the alkoxy amine derivative is added to the polyethylene resin as a masterbatch comprising the alkoxy amine derivative along with a carrier resin comprising LDPE.

2. The method of claim 1 wherein the alkoxy amine derivative corresponds to the formula:

$(R_1)(R_2)N\!-\!O\!-\!R_3$ where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and $R_3$ is hydrogen, a hydrocarbon or a substituted hydrocarbon group comprising O and/or N.

3. The method of claim 1 wherein the alkoxy amine derivative is a hydroxylamine ester.

4. The method of claim 3 wherein the hydroxyl amine ester is hydroxyl amine ester being 9-(acetyloxy)-3,8,10-triethyl-7,8,10-trimethyl-1,5-dioxa-9-azaspiro[5.5]undec-3-yl]methyl octadecanoate.

5. The method of claim 1 wherein the alkoxy amine derivative is reacted with the polyethylene resin in a reactive extrusion process.

6. The method of claim 1 wherein the melt strength is increased by at least 25% compared to a substantially similar polyethylene resin which has not been reacted with an alkoxy amine derivative.

7. The method of claim 1 wherein the alkoxy amine derivative is added in an amount of from 0.01% to 5% of the polyethylene polymer by weight.

8. The method of claim 1 wherein the polyethylene resin has a melt index less than 2.5 g/10 min.

9. The method of claim 1 wherein the alkoxy amine derivative is added in an amount of from 0.0001% to 0.1% of the polyethylene polymer by weight.

* * * * *